US005784452A

United States Patent [19]
Carney

[11] Patent Number: 5,784,452
[45] Date of Patent: Jul. 21, 1998

[54] TELEPHONY CALL CENTER WITH AGENT WORK GROUPS

[75] Inventor: Michael S. Carney, Lowell, Mass.

[73] Assignee: Davox Corporation, Del.

[21] Appl. No.: 634,472

[22] Filed: Apr. 18, 1996

Related U.S. Application Data

[63] Continuation-in-part of Ser. No. 619,164, Mar. 21, 1996, Pat. No. 5,592,543, which is a continuation of Ser. No. 252,121, Jun. 1, 1994, abandoned.

[51] Int. Cl.$^6$ ................................................. H04M 3/00
[52] U.S. Cl. ............................ 379/265; 379/268; 379/269
[58] Field of Search ................................. 379/265, 266, 379/309, 201, 214, 268, 269

[56] References Cited

U.S. PATENT DOCUMENTS 4,881,261  11/1989  Oliphant et al. ......................... 379/265
5,185,780   2/1993  Leggett ................................... 379/265
5,499,291   3/1996  Kepley .................................... 379/265
5,500,891   3/1996  Harrington et al. ..................... 379/269
5,586,179  12/1996  Stent et al. .............................. 379/265
5,592,542   1/1997  Honda et al. ............................ 379/265

Primary Examiner—Ahmad F. Matar
Attorney, Agent, or Firm—Daniel J. Bourque, Esq; Kevin J. Carroll, Esq.

[57] ABSTRACT

A telephony call center management system allows agents to be assigned and grouped into work groups. A supervisor is assigned to supervise one or more work groups. Supervisors may move agents between work groups that the supervisor oversees. A supervisor may also assign unassigned agents to a work group which the supervisor controls. The supervisor may view statistics on the performance of only those agents assigned to a work group to which the supervisor is assigned.

15 Claims, 3 Drawing Sheets

TELEPHONY CALL CENTER WITH AGENT WORK GROUPS

CONTINUATION APPLICATION DATA

This application is a continuation-in-part of U.S. patent application Ser. No. 08/619,164, filed Mar. 21, 1996, now U.S. Pat. No. 5,592,543, which is a continuation of U.S. patent application Ser. No. 08/252,121 filed on Jun. 1, 1994, now abandoned.

FIELD OF THE INVENTION

This invention relates to telephony call center management systems and more particularly, to a telephony call center management system and telephony call center which allows agents to be assigned into and managed and controlled by work groups.

BACKGROUND OF THE INVENTION

Telephony call centers are generally used to provide automatic inbound call distribution and outbound call dialing for organizations such as banks, credit card collection agencies and telemarketers. Such telephony call centers generally include a computerized autodialer which automatically dials customer telephone number supplied by a source such as a host computer, an inbound call distributor, commonly referred to in the industry as an ACD (Automated Call Distributor), various telephony related modules such as voice response units, a number of telephone trunk lines, and a number of agent workstations usually including voice sets such as headphones, and data terminals.

The telephony call center is typically coupled to a host computer system or other similar data storage device containing customer account records. Customer account records typically contain data on the individual customer including telephone number, address, and in the example of credit card accounts, account balance and payment history.

Customer account call records are typically sorted and selected either by the host computer or the telephony call center management system based on selectable criteria such as amount overdue, zip code, products purchased, etc. and grouped into call lists. The call lists are then downloaded to the telephony call center (autodialer portion) for processing.

The telephony call center autodials and places outbound calls to customers or clients, and connects answered calls to an available agent, to allow agents to handle the answered calls. The telephony call center also routes incoming calls from customers to agents. One or more supervisors manage agents and the telephony call center from one or more supervisor workstations connected to the telephony system.

Call centers can handle more than one task at a time. For example, a number of lists of customer account call records downloaded from the host computer to the supervisor workstation or other telephony call center call record processing unit are generally grouped together into call campaigns.

Call campaigns comprise one or more call lists to dial, along with a number of agents assigned to the campaign to handle the calls. These call campaigns are then processed by the telephony call center and the agents until all of the calls have been completed or a time limit for processing the call campaign expires. Several of these outbound call campaigns can run simultaneously, with the system routing calls to appropriate agents as needed.

While outbound dialing activities are underway, inbound call campaigns, which process inbound calls from customers, control the manner in which inbound calls are routed to agents to allow for the processing of incoming calls. With large telephony call center systems, there may be several supervisors, each supervisor in charge of a large number of agents.

Telephony call center with several supervisors and a large number of agents requires a tremendous amount of administration of the system and supervision of agents to avoid the system from quickly becoming unmanageable. Agents and supervisors can be assigned to work on more than one call campaign at a time, be it an outbound call campaign and/or an inbound call campaign. Keeping track of the agent assignments and dynamically altering the assignments if necessary, can get very difficult, if not impossible.

Another problem involves allowing all supervisors to view and modify agent assignments on the supervisory workstation. In prior art telephony systems, any supervisor could modify any agent assignment, such as add or move an agent to other campaigns. Two or more supervisors could mistakenly be modifying the same agent or agents. Additionally, some agents may be over utilized while other agents may be under utilized. This will result in inefficient use of the agents, as well as confusion and other problems.

Accordingly, what is needed is a telephony call center management system which allows for the grouping of agents into work groups, to allow for ease of managing the agents for common tasks, by a supervisor. The grouping must be independent of supervisors to allow efficient use of agents as telephony center resources, and to allow groups of agents to be assigned to different tasks supervised by different supervisors.

SUMMARY OF THE INVENTION

The present invention features a telephony call center that allows agents to be assigned and grouped into work groups. Agents are supervised by one or more supervisors, who may group agents into work groups. A particular supervisor can move agents between work groups that the particular supervisor supervises. A supervisor may also assign unassigned (free) agents to a work group which the supervisor controls. The supervisor may use a work group assignor to assist the supervisory in assigning agents to work groups. The supervisor may view statistics on the performance of only those agents assigned to a work group controlled or supervised by the supervisor.

A telephony resource server controller keeps track of which agents and supervisors are assigned to which work groups, and only allows supervisors to view or modify agent statistics and modify agent assignment of those agents belonging to the work group(s) assigned the supervisor. The telephony resource server controller uses agent data structures and agent attributes to assign agents and supervisors to work groups. An agent attribute for work groups and at least one unique identifier for a specific work group is added to an agent data structure to indicate that the agent has been assigned to a work group. Supervisors have similar data structures, although supervisors can be assigned to more than one work group.

The telephony resource server controller checks the agent data structure to determine if a particular agent belongs to a work group. If a supervisor is assigned to the same work group, the supervisor may control the agent and view statistics on the agent's performance.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
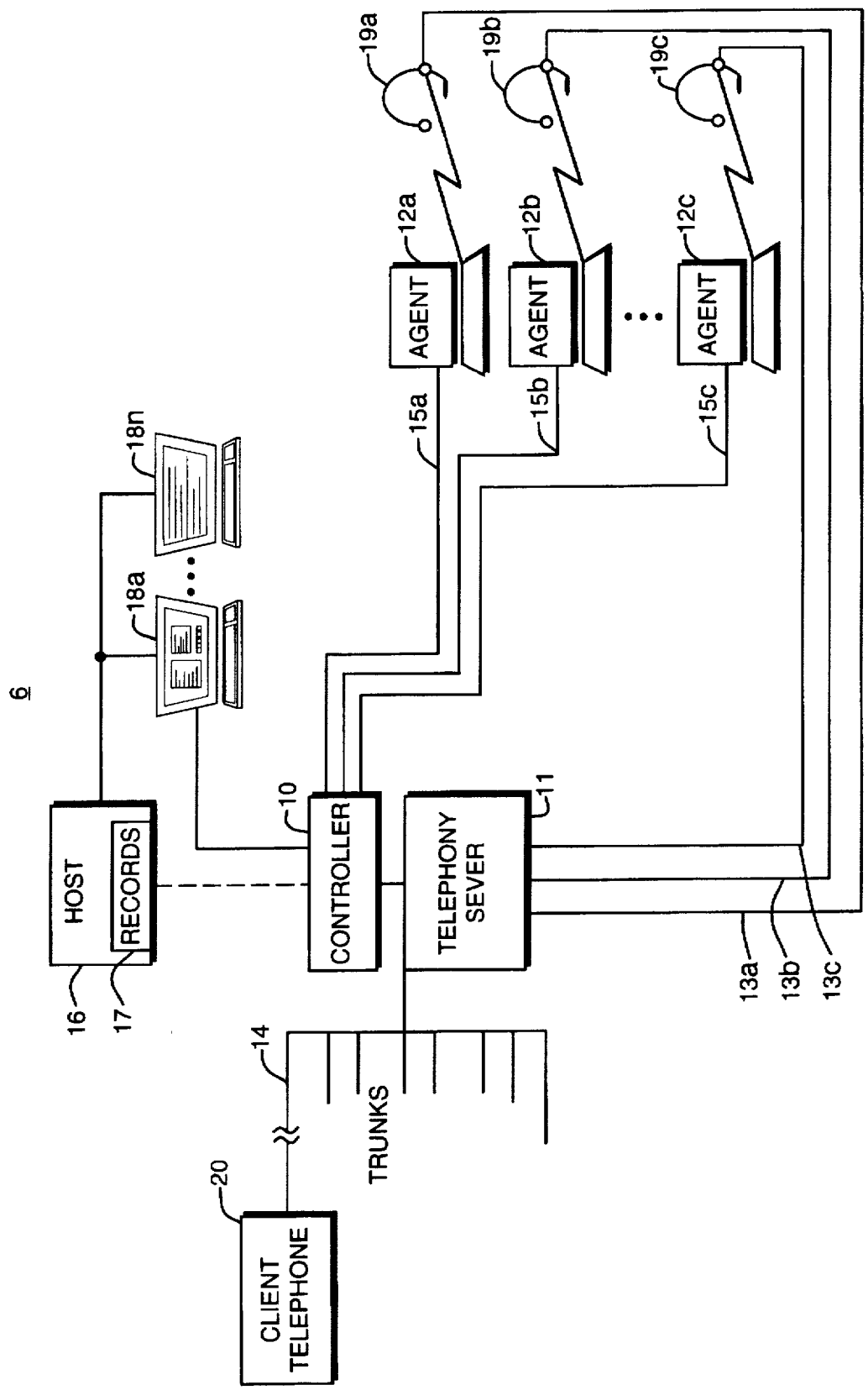
FIG. 1 is a block diagram of a telephony call center and telephony call center management system on which the present invention may be utilized.

A telephony call center 6, FIG. 1, used in conjunction with the present invention is typically coupled to at least one host computer 16, or similar data storage or processing device which contains customer account records 17. The call center groups the customer account records into call lists of customer account records to dial, known as call campaigns, and the call lists downloaded to a controller 10. The controller 10 will then control a telephony resource server 11 which may include one or more telephony elements such as an automatic call dialer to dial outbound calls, an Automated Call Distributor (ACD) to distribute incoming calls, voice response units (VRU's) and other telephony related devices as well known in the art.

Telephony resource server 11 is connected to a plurality of telephone trunk lines 14 which allow calls to be placed to customer telephones 20, and which also serve to receive incoming calls from customer telephones 20. Telephony resource server 11 then routes the voice portion of connected calls over voice signal paths 13 to agent telephones or headsets 19 used above for customer telephones. A telephony resource server controller 10 receives customer account data from host 16, supervisor workstation 18, or other telephony call center record processing source and allows customer account data for individual customers connected to an agent to be displayed on agent workstations 12 as described in greater detail in U.S. Pat. No. 5,164,981 issued to Davox Corporation Nov. 17, 1992, and incorporated herein by reference.

One or more supervisory workstations 18 allows one or more supervisors to monitor, control and manage the call campaigns. Several supervisors may use a single supervisory workstation 18a to manage call campaigns, agents and resources as well as view statistical results of call campaigns. Alternatively, in the preferred embodiment, there are several supervisory workstations 18a–18n connected to controller 10 and host system 16. In the preferred embodiment, supervisory workstations are stand alone workstations, such as Sun SPARC stations. An example of a telephony call center and call center management system on which may be practiced the present invention is the Unison™ system available from Davox Corporation, Westford, Mass.

Figure 2:
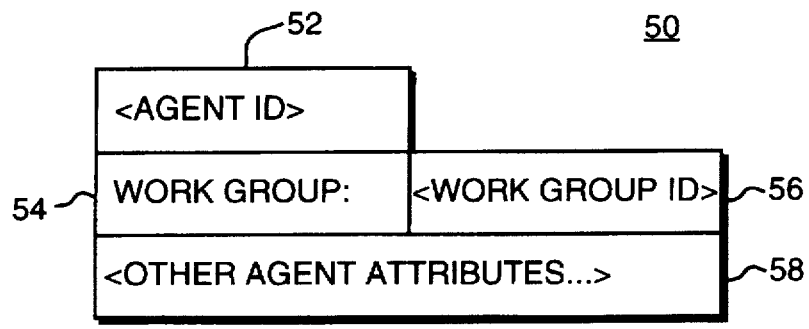
FIG. 2 is a schematic representation of an agent data structure that facilitates assigning agents to work groups.

Supervisory workstations 18a–18n or controller 10 contain software and data structures for tracking agents. For each agent on the system, there is an agent data structure or resource 50, FIG. 2 which contains some data unique to each of the individual agents. Agent data structure 50 is previously filled in by a supervisor or system administrator and activated when an agent logs on to an agent workstation 12a–12c.

Agent data structure 50 includes an agent identification field 52 which contains a unique identifier for that agent. This agent identifier is tied to the agent's log in. Each agent data structure also includes fields for agent attributes 54, 56, 58. Agent attributes are more fully described in co-pending patent application Ser. No. 08/619,164 now U.S. Pat. No. 5,592,543 entitled METHOD AND SYSTEM FOR ALLOCATING AGENT RESOURCES TO A TELEPHONE CALL CAMPAIGN assigned to the assignee of the present invention and fully incorporated herein by reference.

One such attribute which may be set is the agent attribute identifier for work groups 54. This agent attribute identifier indicates that the agent associated with agent data structure 50 has been assigned to a particular work group. Agent data structure 50 also includes a work group identification field 56. If an agent is assigned to a work group, work group identification field 56 will contain at least one unique identifier value which identifies the work group which the agent has been assigned. In the preferred embodiment, an agent may only be assigned to one work group however, this is not a limitation of the present invention.

Agent data structure 50 may contain other data 58, including other agent attributes such as experience attributes and language attributes. If the agent has not been assigned to any work group, then agent attributes field 54 will not contain the work groups agent attribute identifier, and the work group identification field 56 will not contain a unique identifier value for a work group.

Agents are assigned to work groups by a supervisor using a system editing function. The supervisor, working on a supervisory workstation 18 instructs a work group assignor, which may be on workstation 18 or controller 10 to modify the agents data structure 50 by adding the agent attribute identifier for work groups 54 to agent data structure 50, and a unique predetermined work group identifier value to work group identification field 56. In the preferred embodiment, the supervisory workstations 18a–18n include a Graphic User Interface (GUI), such as Sun OPEN/LOOK, to assist the supervisor in easily creating new work groups, and moving agents between work groups by editing agent data structures 50.

Figure 3:
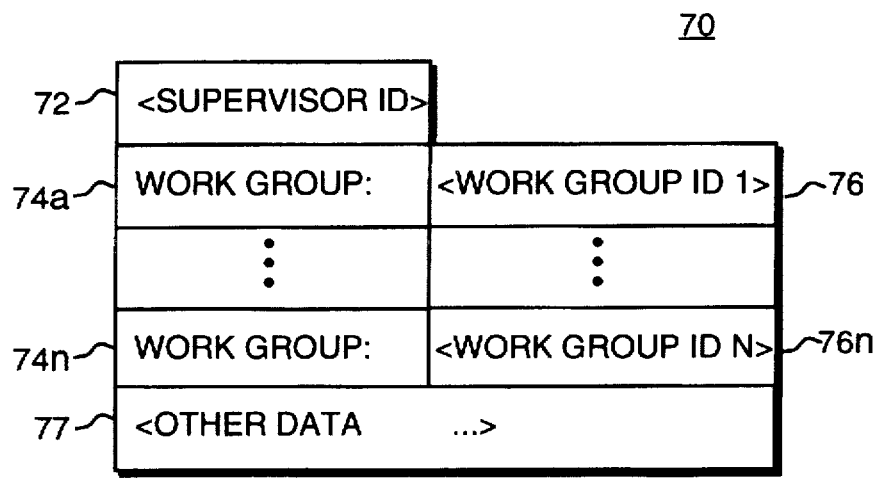
FIG. 3 is a schematic representation of a supervisor data structure that facilitates assigning supervisors to one or more work groups.
Figure 4:
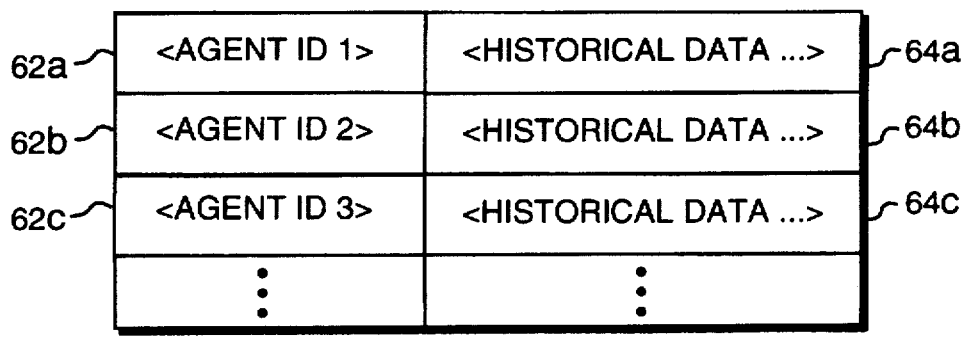
FIG. 4 is a schematic representation of a data structure for storing data on agent performance.

Supervisor data is stored on the telephony call center management system as a similar data structure or resource 70, FIG. 3. The supervisor data structure 70 includes a supervisor identification field 72, which contains a unique identifier for that supervisor. Each supervisor logged onto the telephony call center management system will have an associated supervisor data structure 70 with unique identifier field 72. Supervisor data structure 70 includes work group identification fields 74a–74n and may also include other fields/data 77.

Supervisors can be assigned to no work groups, or one or more work groups. If a supervisor is assigned to a work group, an identifier for work groups 74a–74n will be in supervisor data structure 70 along with a unique identifier value 76a–76n for a work group. This unique work group identifier value 76a–76n will match a work group identifier value 56 FIG. 2 in an agent data structure 50 if the agent and supervisor belong to the same work group. Supervisor data structure 70 FIG. 3 may also contain more than one of the identifier for work groups 74a–74n and other unique identifiers 76a–76n for a work group, for each work group that the supervisor associated with supervisor data structure 70 belongs to. In the preferred embodiment, supervisors may be assigned work groups by a system administrator, or may create their own work groups and assign agents to those work groups at will.

A supervisor or system administrator uses a supervisory workstation 18 to request the telephony call center management system to assign an agent to a new work group by changing the work group identification field 56, of the agent data structure 50. This will cause the telephony call center management system to instantaneously treat the agent as belonging to the new work group. However, if a supervisor views agent performance statistics on that agent's performance, the statistics will cover the entire time the agent has been logged in, instead of just the agent's time in the new work group. For example, if a given agent's supervisor assigns her to a new work group in the middle of her shift, and the supervisor then observes performance statistics on her (such as idle time, time spent talking to customers etc.), the statistics will reflect the agent's entire shift, not just her time in the new work group.

When a supervisor requests information on a particular work group such as agent statistics, the telephony call center management system accesses the supervisor's data structure 70, FIG. 3. By checking all work group identification fields 74 present in the requesting supervisor's data structure, the call management system determines if the supervisor has access to that work group. If so, the telephony call center management system scans through all active agent data structures 50. The system checks the agent data structures 50 for agent attribute identifier for work groups 54 and work group identification field 56 that matches the selected group identifier value in the supervisor's data structure 70. The system selects agents who are members of the selected work group. The telephony call center management system can then display the agent activities on the supervisory workstation screen, along with calculated statistics.

In the preferred embodiment, the telephony call center management system stores data on agent activities and performance in a data structure 60. A unique agent identifier 62, the same agent identifier contained in field 52 of agent data structure 50, is coupled with agent or call data contained in field 64. The data stored in field 64 is independent of any work group the agent is assigned to. The telephony call center management system may scan the data structure for performance data 64 on agents based on agent identifiers 62.

If a supervisor is assigned to the same work group as an agent, that supervisor has all the control and monitoring ability over the agent that the supervisor would have if work groups were not in use. The supervisor has similar control and monitoring over agents unassigned to any work group. The supervisor can even create new work groups and assign agents to them. However, the supervisor has no control or monitoring ability over agents belonging to work groups to which the supervisor is not part of, unless the supervisor is assigned to no work groups (a system administrator).

Figure 5:
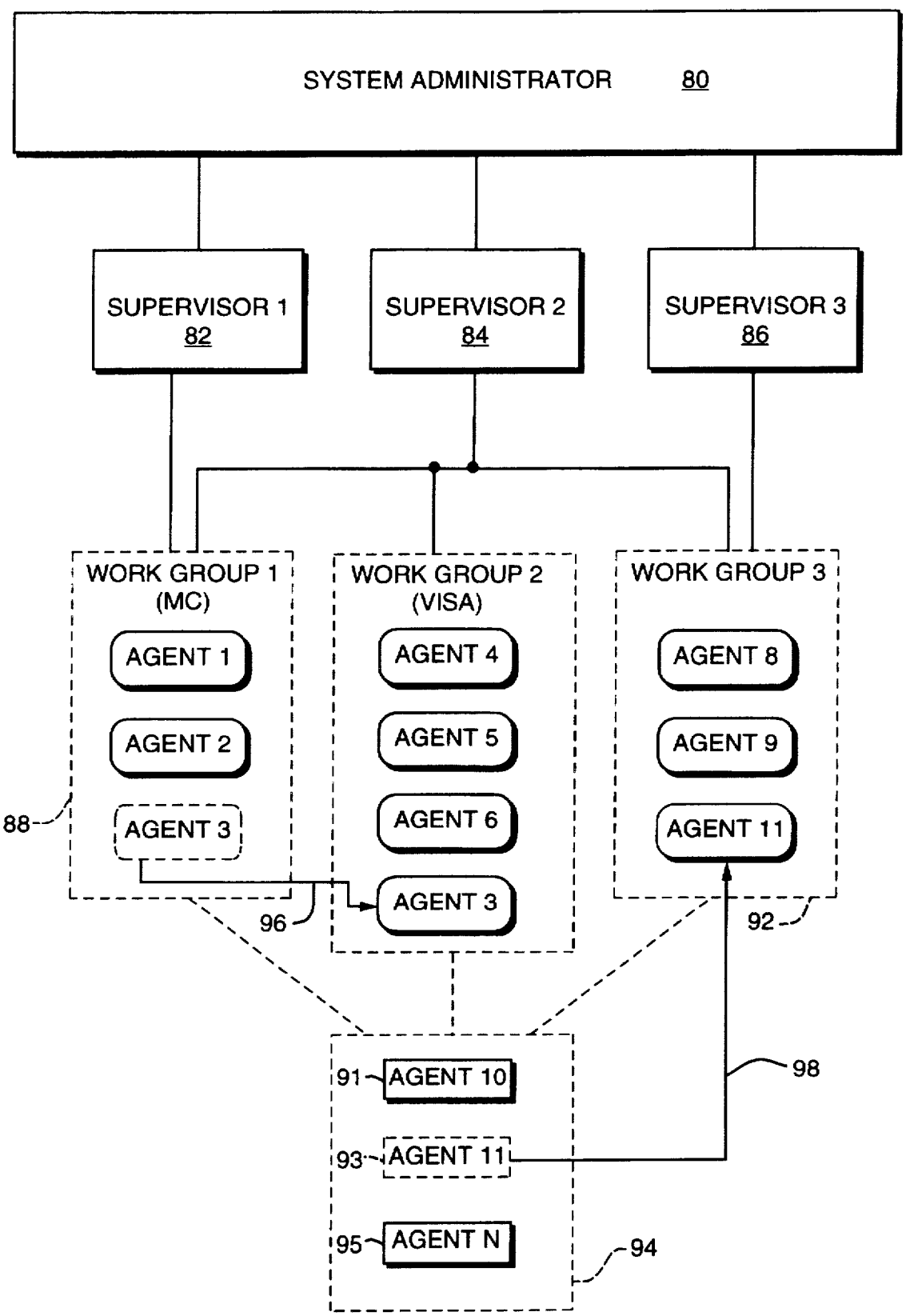
FIG. 5 is a block diagram showing an exemplary hierarchy of a system employing several supervisors and work groups as disclosed by the present invention.

A system administrator 80, FIG. 5 initiates the running of the telephony call center and assigns supervisors to supervise agents and campaigns. In an exemplary system, system administrator 80 assigns a first supervisor 82 to supervise a group of agents in a first work group 88. The second supervisor 84 is assigned to supervise work group 88, work group 90 and work group 92. Supervisor 84 may, therefore, view statistics on any of the agents in the first, second or third work groups 88, 90, 92, while the first supervisor 82 may only view statistics on agents in work group 88. The third supervisor 86 is assigned to oversee only work group 92. The activities and performance statistics of unassigned agents, including agent 91-95 can be viewed by all supervisors 82, 84, 86.

Since second supervisor 84 has control over both work groups 88 and 90, he or she may move agents between those two work groups. For example, agent 3 in work group 88 may be moved to work group 90 as generally shown by arrow 96. Further, since agent 11 (93) is not presently in any work group, supervisor 84 or supervisor 86 may move (assign) agent 93 to work group 92 as generally shown by arrow 98. Either supervisor 84 or supervisor 86 may perform this function since they both are assigned to supervise work group 92. Further, the first supervisor 82 may move (assign) agent 11 (93) to work group 88 (not shown).

By combining agents into work groups, a supervisor can more easily group agents according to their function, abilities or call campaign handling. For example, agents in work group 88 may be working on a Mastercard customer overdue account collection campaign, while the agents in work group 90 are working on a VISA customer overdue account collection campaign. Several agent work groups may work on the same campaign. If a supervisor has a group of highly skilled agents who are efficient at convincing delinquent customers to pay their bills, these agents may be put into one separate and special work group (a "SWAT" group). This work group (and all the agents who are part of this work group) may then be moved from campaign to campaign, as needed, to help increase the success of the call campaign.

Accordingly, the present invention allows users and supervisors of a telephony call center to group agents together into work groups. This allows supervisors to conveniently assign agents and view statistics and activities of agents as a group.

Modifications and substitutions by one of ordinary skill in the art are considered to be within the scope of the present invention which is not to be limited except by the claims which follow.

What is claimed is:

1. A telephony call center management system including:
   a plurality of agent workstations, each of said plurality of agent work stations for use by an agent;
   at least one agent work group assignor, for assigning an agent from at least one of said plurality of agent workstations to at least one predetermined agent work group;
   at least one agent supervisor workstation, for use by at least one agent supervisor;
   at least one agent supervisor work group assignor, for assigning an agent supervisor at said at least one agent supervisor workstation to supervise said at least one predetermined agent work group;
   a telephony resource server, coupled to said plurality of agent workstations, for handling at least one telephone call over at least one telephone trunk line; and
   a telephony resource server controller, responsive to said assignment of said at least one agent to said predetermined agent work group by said at least one work group assignor and to said assignment of said supervisor to said at least one predetermined agent work group by said at least one agent supervisor work group assignor, for allowing said at least one supervisor to at least view telephony call center statistics on said at least one agent assigned to said at least one predetermined agent work group, and for allowing said agent supervisor at said agent supervisor workstation to assign at least one unassigned agent to said at least one predetermined agent work group to which said agent supervisor is assigned.

2. The telephony call center management system of claim 1, wherein said at least one predetermined agent work group includes a plurality of agent work groups, wherein said agent supervisor work group assignor assigns at least one system administrator to said plurality of agent work groups, and wherein said system administrator assigns at least one of said plurality of agent work groups to each said at least one agent supervisor.

3. The telephony call center management system of claim 1, wherein said telephony resource server controller includes an agent data structure, said agent data structure including a work group identifier value for providing an indication that said agent is assigned to said at least one predetermined agent work group.

4. The telephony call center management system of claim 1, wherein said telephony resource server controller includes a supervisor data structure, said supervisor data structure including a work group identifier value for providing an indication that said agent supervisor has at least one predetermined work group assignment.

5. The telephony call center management system of claim 1, wherein said telephony resource server controller includes a data structure for storing information on agent activities and performance.

6. A telephony call center management system, for managing agents in a telephone call center, said telephone call center including a telephony resource server, for controlling telephone calls in said telephone call center and handling of said telephone calls by said agents, said telephony call center management system comprising:

a plurality of agent workstations, for use by said agents, wherein said agents at said plurality of agent workstations are assigned to a plurality of agent work groups;

an agent data structure including a plurality of agent identifiers, for identifying each of said agents, and a work group identifier associated with at least some of said plurality of agent identifiers, for identifying an agent work group to which an agent is assigned;

at least one agent supervisor workstation, for use by at least one agent supervisor, wherein said agent supervisor is assigned to at least one of said plurality of agent work groups;

a supervisor data structure including at least one agent supervisor identifier, for identifying said at least one agent supervisor, and at least one work group identifier associated with said at least one agent supervisor identifier, for identifying at least one of said plurality of agent work groups to which said at least one agent supervisor is assigned;

a telephony resource server controller, responsive to said agent data structure and said supervisor data structure, for allowing said at least one agent supervisor to manage agents in said at least one of said plurality of agent work groups identified by said at least one work group identifier associated with said agent supervisor identifier.

7. The telephony call center management system of claim 6 wherein said telephony resource server controller allows said at least one agent supervisor to assign unassigned agents to said at least one of said plurality of agent work groups identified by said at least one work group identifier associated with said agent supervisor identifier.

8. The telephony call center management system of claim 6 wherein said supervisor data structure includes at least first and second work group identifiers associated with said at least one agent supervisor identifier, for identifying first and second agent work groups to which said at least one agent supervisor is assigned, and wherein said telephony resource server controller allows said at least one agent supervisor to re-assign agents between said first and second agent work groups identified by said first and second work group identifiers associated with said agent supervisor identifier.

9. The telephony call center management system of claim 6 wherein said telephony resource server controller allows said at least one agent supervisor to view telephony call center statistics on only said agents in said at least one of said plurality of agent work groups identified by said at least one work group identifier associated with said agent supervisor identifier.

10. The telephony call center management system of claim 6 further including a statistic data structure including said plurality of agent identifiers, for identifying each of said agents, and historical data associated with each of said plurality of agent identifiers and pertaining to said agents identified by each of said plurality of agent identifiers.

11. A method of managing agents in a telephone call center including a telephony resource server, for controlling telephone calls in said telephone call center and handling of said telephone calls by said agents, said method comprising:

providing an agent data structure including a plurality of agent identifiers, for identifying each of said agents, and a work group identifier associated with at least some of said plurality of agent identifiers, for identifying an agent work group to which an agent is assigned;

providing a supervisor data structure including at least one agent supervisor identifier, for identifying said at least one agent supervisor, and at least one work group identifier associated with said at least one agent supervisor identifier, for identifying at least one of said plurality of agent work groups to which said at least one agent supervisor is assigned;

least one of said plurality of agent work groups to which each said at least one agent supervisor is assigned;

scanning said agent data structure to determine said agents assigned to said at least one of said plurality of work groups to which each of said at least one agent supervisor is assigned; and allowing each of said at least one supervisor to manage only said agents assigned to said at least one of said plurality of work groups to which each of said at least one agent supervisor is assigned.

12. The method of claim 11 wherein the step of allowing each of said at least one supervisor to manage only said agents assigned to said at least one of said plurality of work groups to which each of said at least one agent supervisor is assigned includes allowing each of said at least one supervisor to assign unassigned agents to said at least one of said plurality of work groups to which each of said at least one agent supervisor is assigned.

13. The method of claim 12 wherein said supervisor data structure includes at least first and second work group identifiers associated with said at least one agent supervisor identifier, for identifying first and second agent work groups to which said at least one agent supervisor is assigned; and wherein the step of allowing each of said at least one supervisor to manage only said agents assigned to said at least one of said plurality of work groups to which each of said at least one agent supervisor is assigned includes allowing each of said at least one supervisor to re-assign agents between said first and second agent work groups.

14. The method of claim 11 wherein allowing each of said at least one supervisor to manage only said agents assigned to said at least one of said plurality of work groups to which each of said at least one agent supervisor is assigned includes allowing said supervisor to view statistics pertaining to said agents.

15. The method of claim 14 further including the steps of:

providing a statistical data structure including said plurality of agent identifiers, for identifying each of said agents, and historical data associated with each of said plurality of agent identifiers and pertaining to said agents identified by each of said plurality of agent identifiers; and scanning said statistical data structure to determine historical data pertaining to said agents assigned to said at least one of said plurality of work groups to which each of said at least one agent supervisor is assigned.

* * * * *